United States Patent [19]

Kim

[11] Patent Number: 5,697,075
[45] Date of Patent: Dec. 9, 1997

[54] DIVERSITY APPARATUS FOR A GLOBAL POSITIONING SYSTEM ANTENNA

[75] Inventor: Kyung-Ho Kim, Kyonggi-Do, Rep. of Korea

[73] Assignee: Hyundai Electronics Industries Co., Ltd., Rep. of Korea

[21] Appl. No.: 363,602

[22] Filed: Dec. 23, 1994

[30] Foreign Application Priority Data

Dec. 23, 1993 [KR] Rep. of Korea ............. 93-29298

[51] Int. Cl.$^6$ ............................................. H04B 7/08
[52] U.S. Cl. ............................ 455/133; 455/134; 455/275; 455/277.1
[58] Field of Search ............................. 455/133, 140, 455/275, 277.1, 277.2, 3.2, 126, 131, 132, 134, 135; 333/17.1, 101, 103, 104, 262

[56] References Cited

U.S. PATENT DOCUMENTS

| | | | |
|---|---|---|---|
| 4,186,347 | 1/1980 | Brockman et al. | 375/324 |
| 4,525,869 | 7/1985 | Hamada et al. | 455/278.1 |
| 4,578,819 | 3/1986 | Shimizu | 455/277.2 |
| 5,161,252 | 11/1992 | Higuchi et al. | 455/277.1 |
| 5,194,871 | 3/1993 | Counselman, III. | |
| 5,214,393 | 5/1993 | Aihara | 455/126 |
| 5,345,591 | 9/1994 | Tsurumaki et al. | 455/3.2 |
| 5,390,357 | 2/1995 | Nobusawa et al. | 455/277.1 |

FOREIGN PATENT DOCUMENTS

| | | | |
|---|---|---|---|
| 517196 | 12/1992 | European Pat. Off. | 455/277.2 |
| 168440 | 12/1981 | Japan | 455/277.1 |

*Primary Examiner*—Reinhard J. Eisenzopf
*Assistant Examiner*—Thanh Le
*Attorney, Agent, or Firm*—David M. Klein; Bryan Cave LLP

[57] ABSTRACT

A diversity apparatus for a global positioning system antenna capable of selectively using a better receiving sensitivity antenna among antennas is disclosed. The invention includes at least two antennas; first and second amplification comparing means for amplifying signals received from the antenna through a low noise amplifier and a coupling line and for comparing a direct current with a base voltage; selection means for selecting one antenna among the antennas by activating an impedance line; and first and second connection means for determining from the amplified signals, which of the antenna signals to output, and outputting the alternating current signal from that antenna.

5 Claims, 2 Drawing Sheets

| CLOCK | J | K | Q | Q* |
|---|---|---|---|---|
| ↓ | L | L | Q | Q* |
| ↓ | H | L | H | L |
| ↓ | L | H | L | H |
| ↓ | H | H | TOGGLE | |

DIVERSITY APPARATUS FOR A GLOBAL POSITIONING SYSTEM ANTENNA

BACKGROUND OF THE INVENTION

1. Field of the Invention

The present invention relates generally to a diversity apparatus for a global positioning system antenna, and more particularly to a diversity apparatus for a global positioning system antenna, especially for vehicles, which is capable of selecting the antenna with a better receiving sensitivity from among a plurality of antennas. The system is available to all the signal receiving systems, regardless of the antenna diversity apparatus in the Global Positioning System or the microwave receiving apparatus.

2. Description of the Related Art

A conventional diversity apparatus, as shown in FIG. 1, includes a switch i for selecting one antenna from among a plurality of antennas ANT1 and ANT2. A low band filter 2, connected to the output terminal of the switch 1, passes current of a frequency lower than a cut-off frequency of the filter 2 and reduces the higher frequencies. A mixer 3 is connected to an output terminal of the low band filter 2. A base frequency generator 7 is connected to an input terminal of the mixer 3. A low-pass filter 4 is connected to an output terminal of the mixer 3. An amplifier 5 amplifies the output signal of the low band filter 4. A demodulator 6 demodulates the output of the amplifier 5 to obtain the original signal.

A low-pass filter 9 passes current of a frequency lower than the cut-off frequency without reducing this signal, and reduces higher frequencies. An amplifier 11 amplifies the output signal of the low-pass filter 9. A rectifier 12 rectifies the amplified signal. A comparator 13 compares the rectified signal with a base voltage. A toggle control circuit 14, toggled by the output of the comparator 13, transfers the toggled signals to the switch 1.

The radio frequency signals passed from the filter 2 and the base frequency generated at the base frequency generator 7 are mixed at the mixer 3. The mid-frequency signal outputted from the mixer 3 is inputted into the low-pass filter 4, of which frequencies higher that the cut-off frequency are filtered. The lower frequency is amplified at the amplifier 5 and is demodulated at the demodulator DEM. The outputted data are inputted into the rectifier 12 through the low band filter 9 and the amplifier 11, in which the direct current is filtered. The direct current voltage component detected at rectifier 12 is compared with the base voltage $V_{ref}$ previously set at comparator 13. At this time, when the direct current is higher than the base voltage, the switch 1 is activated by the output of the toggle circuit 14. The antenna ANT1 or ANT2 having the higher sensitivity is selected.

However, with a conventional diversity apparatus, a system which does not have a diversity apparatus cannot obtain the diversity function by adding at least one antenna.

SUMMARY OF THE INVENTION

Accordingly, it is an object of the present invention to provide a diversity apparatus for a global positioning system antenna capable of selecting an antenna having the best receiving sensitivity from amongst a plurality of antennas by comparing the radio frequency signal of the current antenna with a compared base level of a newly added antenna.

To achieve this object, the invention includes at least two antennas; first and second amplification comparing means for amplifying signals received from the antennas through a low noise amplifier and a coupling line, and for comparing a direct current signal from the antennas with a base voltage; selection means for selecting one antenna among the antennas by activating an impedance line; and first and second connection means for determining, from the amplified signals, which of the antenna signals to output, and cutting off direct current of the impedance line by opening the alternating current component.

DESCRIPTION OF THE PREFERRED EMBODIMENT

Figure 1:
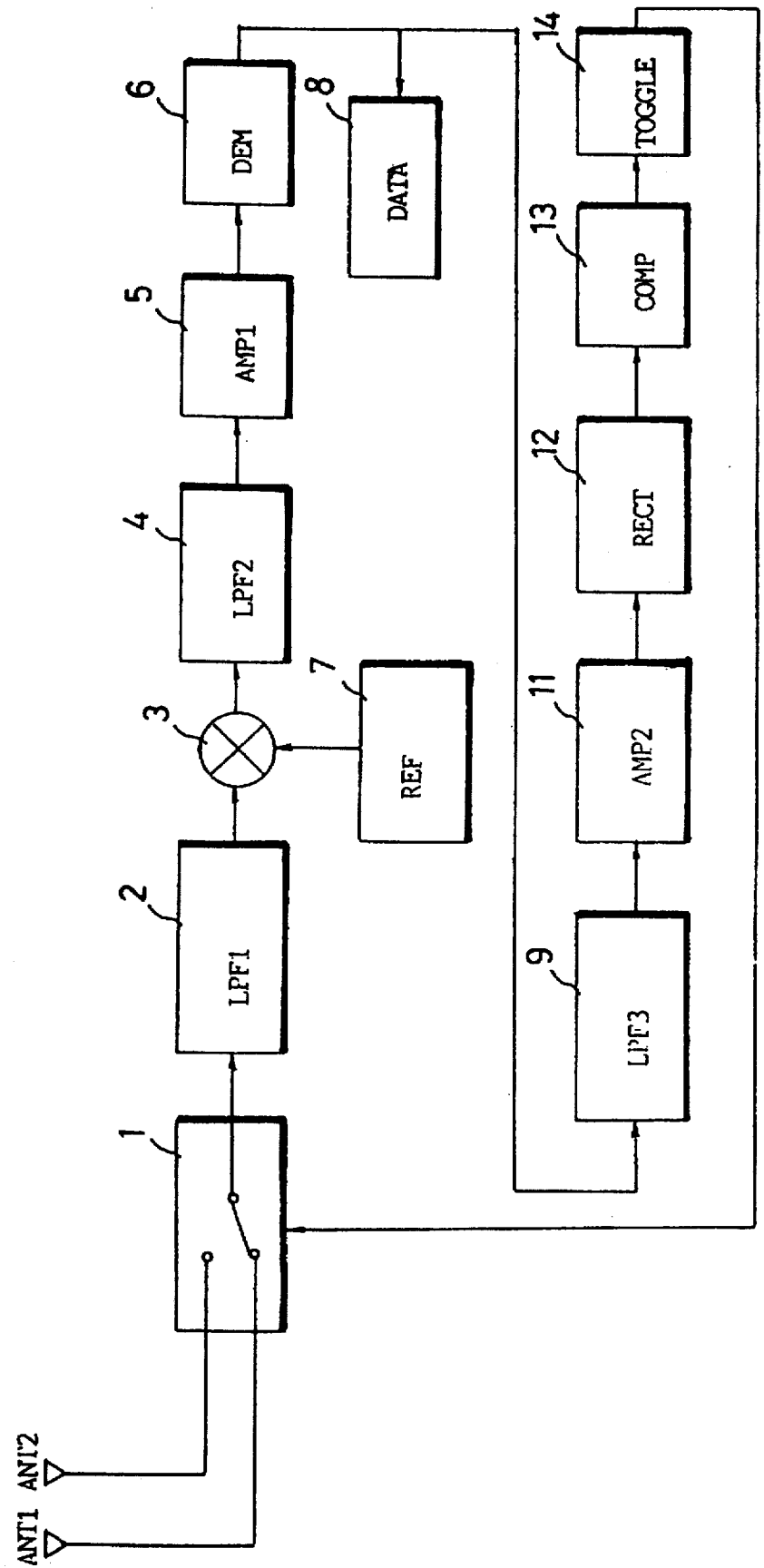
FIG. 1 is a block diagram showing a conventional diversity apparatus.
Figures 2, 3:
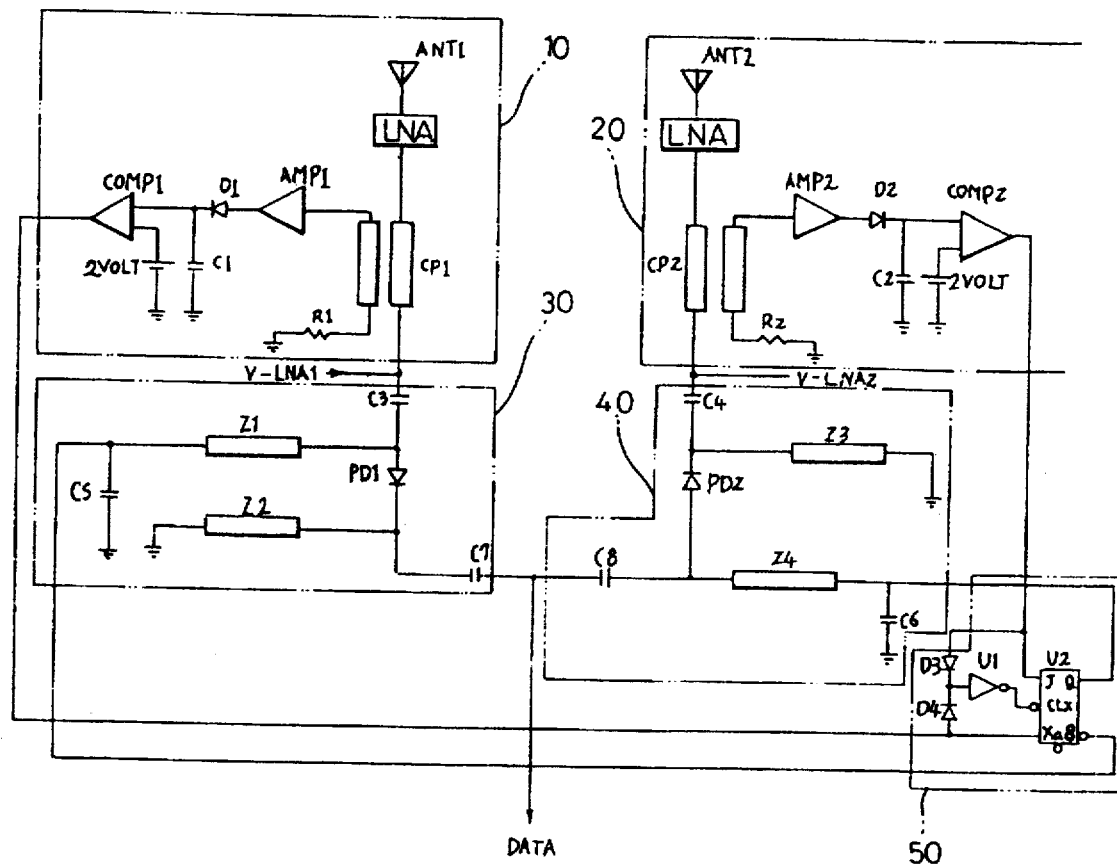
FIG. 2 is a block diagram showing a diversity apparatus for a Global Positioning System antenna according to the present invention.
FIG. 3 is a truth table showing the state of the flip-flop input/output of FIG. 2.

Referring to FIG. 2, the present invention includes amplification comparing circuits 10 and 20 for amplifying the signals received from an antenna and for obtaining the direct current therefrom and for comparing the current with a base voltage; a selector 50 for receiving the signals outputted from the amplification comparing circuits 10 and 20 and for selecting one antenna among antennas ANT1 and ANT2 by activating an impedance line; decision circuits 30 and 40 for determining whether to output the amplified signal received from the antenna ANT1 or ANT2 by cutting off the direct current and opening the alternating current for that antenna output; and power units V-LNA1 and V-LNA2 of the low noise amplifier, for selectively providing power to the circuitry.

Each of amplification comparing circuits 10 and 20 includes: A low noise amplifier LNA for amplifying the signal received from each of the antennas ANT1 and ANT2; a coupling line CP1 and CP2 for combining the output signal of the low noise amplifier LNA with other portions of the circuit; amplifiers AMP1 and AMP2 for amplifying the output signal of the coupling lines CP1 and CP2; a pair of ground resistances R1 and R2, connected to the coupling lines CP1 and CP2, for eliminating any reflection waves; a pair of diodes D1 and D2 for passing the direct current of the output signals of the amplifiers AMP1 and AMP2; a pair of ground capacitors C1 and C2 connected to the diodes D1 and D2; and a pair of comparators COMP1 and COMP2 for comparing the voltages passed through the diodes D1 and D2 with a ground voltage, preferably 2V.

The selector 50 includes diodes D3 and D4 for passing the direct current portion of the output signals from the comparators COMP1 and COMP2 of the amplification comparing circuits 10 and 20; an invertor U1, connected to the diodes D3 and D4, for inverting the output signals of the diodes D3 and D4; a flip-flop U2 in which the output of the comparators COMP1 and COMP2 are inputted into the input terminals K and J, respectively.

The decision circuits 30 and 40 include impedance matching lines Z1 and Z4, connected to the output terminals Q and Q'. These impedance lines have characteristics for cutting off direct current and for permitting the passage of alternating current; ground capacitors C5 and C6 connected to the input side of the impedance matching lines Z1 and Z4; capacitors C3 and C4 for cutting off the direct current of low noise amplifier power units V_LNA1 and V_LNA2 and for passing the alternating current of the received signals; pin diodes PD1 and PD2 turned on by the direct current voltage transferred from the impedance lines Z1 and Z4; ground impedance lines Z2 and Z3 for eliminating the direct current from the output signals of the pin diodes PD1 and PD2; and capacitors C7 and C8 for passing the alternating current.

The operation of a diversity apparatus of a global positioning system antenna according to the present invention will now be explained.

The signals received from the antennas ANT1 and ANT2 are transferred to the coupling lines CP1 and CP2. Any reflections are eliminated by ground resistors R1 and R2. The signals are amplified at the amplifiers AMP1 and AMP2 and thereafter the signals are passed through the diodes D1 and D2. The direct current voltage is compared at the comparators COMP1 and COMP2 and thereafter the compared output is inputted into the input terminals K and J of the flip flop U2 and the diodes D4 and D3. The signal passed through diodes D4 and D3 is inverted at the invertor U1 and inputted into the clock terminal CLK of the flip flop U2.

Meanwhile, the output terminals Q' and Q are respectively connected to the impedance lines Z1 and Z4 of the decision circuits 30 and 40. When the output of the selector is high, the high level output passes the impedance matching lines Z1 and Z4 in the decision circuits 30 and 40 and turns on the pin diodes PD1 and PD2, and therefore the received signals inputted through the coupling lines CP1 and CP2 is passed therethrough. The direct current voltage is eliminated through the impedance lines Z2 and Z3 and the capacitors C7 and C8, and then the alternating current component is outputted therethrough.

As described above, the present invention is capable of selectively using a better receiving sensitivity antenna among antennas disposed in a Global Positioning System, especially for a vehicle, and of being available to all the signals in a receiving system irrespective to the antenna diversity apparatus in the Global Positioning System or the microwave receiving apparatus.

What is claimed is:

1. A diversity apparatus for a global positioning system antenna comprising;
   a pair of antennas;
   a pair of low noise amplifiers, each being connected to a corresponding one of the antennas;
   a pair of amplification and comparison units for amplifying an RF signal received through the corresponding antenna and for comparing the amplified signal with a reference signal, each amplification and comparison unit generating an output;
   a pair of common lines for passing the received RF signal from the corresponding antenna and for supplying a DC voltage from an external power source to the corresponding low noise amplifier;
   a pair of switching units for passing an AC signal from the corresponding one of the common lines and for blocking a DC signal; and
   selection means for selecting one of the switching units in response to the outputs from the amplification and comparison units so that a signal from the selected switching unit is output, the selection means comprising a J-K flip-flop being operated in response to outputs of the amplification and comparison units and a pair of diodes with their outputs connected to each other for supplying their connected output signals as a clock pulse to the flip-flop.

2. The apparatus of claim 1 wherein each of the amplification and comparison units comprises:
   a pair of coupling lines in which an RF signal from the corresponding antenna is received via the corresponding low noise amplifier so as to be induced from one of the coupling lines to the other;
   a first amplifier for amplifying the induced signal from the other coupling line;
   a DC switching part for eliminating a DC component of the amplified signal; and
   a comparator for comparing a signal from the switching part with a reference voltage.

3. The apparatus of the claim 2 wherein the switching units each comprise:
   a first impedance line for by-passing the DC component among an inverted output of the flip-flop;
   a second impedance line for by-passing an AC component of the combination of the received signal from the corresponding antenna and the DC signal produced through the first impedance line and for eliminating the DC signal of the combination by connecting the other end of the second impedance line to ground; and
   a pin diode connected between the other end of the first impedance line and one end of the second impedance line for performing an on-off operation in response to the DC signal passed through the impedance line.

4. The apparatus of the claim 1 wherein the switching units each comprise:
   a first impedance line for by-passing the DC component among an inverted output of the flip-flop;
   a second impedance line for by-passing an AC component of the combination of the received signal from the corresponding antenna and the DC signal produced through the first impedance line and for eliminating the DC signal of the combination by connecting the other end of the second impedance line to ground; and
   a pin diode connected between the other end of the first impedance line and one end of the second impedance line for performing an on-off operation in response to the DC signal passed through the impedance line.

5. A diversity apparatus for a global positioning system antenna, comprising:
   at least two antennas;
   first and second amplification and comparison means for amplifying signals received from the antennas and for comparing a DC component of the signals with a base voltage, each comparison means generating an output;
   selection means for receiving the outputs of the comparison means and for selecting one antenna among the antennas based upon the state of the outputs, the selection means comprising i) a plurality of diodes for passing a DC component of the output signals of the comparison means, the outputs of the diodes being connected; ii) an invertor for inverting the connected outputs of the diodes; iii) an impedance line for selecting from among the antenna outputs; and iv) a flip-flop receiving as inputs the connected outputs of the diodes and the outputs of the comparison means, the flip-flop comprising a pair of output terminals connected to the impedance line for controllably selecting from among the antenna outputs based upon the state of the inputs to the flip-flop; and
   first and second connection means for receiving the amplified output of the selected antenna, for cutting off a DC component of the selected amplified antenna output, and for outputting an AC component of the selected amplified antenna output.

* * * * *